(12) United States Patent
Iwamoto

(10) Patent No.: US 7,794,096 B2
(45) Date of Patent: Sep. 14, 2010

(54) ILLUMINATING LAMP FOR A DISPLAY DEVICE, AN ILLUMINATING DEVICE FOR A DISPLAY DEVICE, AND A DISPLAY DEVICE

(75) Inventor: Kenichi Iwamoto, Kobe (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 11/995,759

(22) PCT Filed: Jul. 18, 2006

(86) PCT No.: PCT/JP2006/314146

§ 371 (c)(1),
(2), (4) Date: Feb. 15, 2008

(87) PCT Pub. No.: WO2007/010886

PCT Pub. Date: Jan. 25, 2007

(65) Prior Publication Data

US 2009/0033234 A1 Feb. 5, 2009

(30) Foreign Application Priority Data

Jul. 15, 2005 (JP) .............................. 2005-206886

(51) Int. Cl.
*G09F 13/04* (2006.01)
*H01J 17/00* (2006.01)
(52) U.S. Cl. ..................................... 362/97.2; 313/567
(58) Field of Classification Search ............. 315/185 R, 315/189; 313/567, 568, 569; 362/97.1, 97.2; 345/102
See application file for complete search history.

(56) References Cited

U.S. PATENT DOCUMENTS

| 5,072,155 | A | | 12/1991 | Sakurai et al. |
| 5,514,934 | A | * | 5/1996 | Matsumoto et al. ......... 313/607 |
| 6,566,821 | B2 | * | 5/2003 | Nakatsuka et al. ..... 315/209 PZ |
| 7,138,974 | B2 | * | 11/2006 | Hirakata et al. ............... 345/98 |
| 7,258,462 | B2 | * | 8/2007 | Yamashita et al. .......... 362/225 |
| 7,314,288 | B2 | * | 1/2008 | Wakabayashi .............. 362/225 |
| 7,427,977 | B2 | * | 9/2008 | Park et al. .................... 345/102 |
| 7,595,583 | B2 | * | 9/2009 | Yamashita et al. .......... 313/493 |

(Continued)

FOREIGN PATENT DOCUMENTS

JP 2-97747 U 8/1990

(Continued)

OTHER PUBLICATIONS

Official communication issued in the International Application No. PCT/JP2006/314146, mailed on Oct. 10, 2006.

(Continued)

*Primary Examiner*—Thuy Vinh Tran
(74) *Attorney, Agent, or Firm*—Keating & Bennett, LLP

(57) ABSTRACT

An illuminating lamp for a display device is capable of minimizing a luminance difference between a high-voltage driving side and a low-voltage driving side. The illuminating lamp is arranged behind a display panel via optical sheets and driven in a high-voltage driving method. The illuminating lamp includes discharge lamps connected in series, wherein gas pressures of the discharge lamps at a high-voltage driving side are set to be higher than those of the discharge lamps at a low-voltage driving side.

5 Claims, 13 Drawing Sheets

U.S. PATENT DOCUMENTS

2002/0130628 A1 9/2002 Shin
2005/0122741 A1 6/2005 Takata

FOREIGN PATENT DOCUMENTS

| JP | 4-248244 A | 9/1992 |
|---|---|---|
| JP | 5-4133 U | 1/1993 |
| JP | 07-020463 A | 1/1995 |
| JP | 9-190889 A | 7/1997 |
| JP | 2003-36703 A | 2/2003 |

OTHER PUBLICATIONS

English translation of JP 2-97747U, Published on Aug. 3, 1990.

* cited by examiner

ILLUMINATING LAMP FOR A DISPLAY DEVICE, AN ILLUMINATING DEVICE FOR A DISPLAY DEVICE, AND A DISPLAY DEVICE

BACKGROUND OF THE INVENTION

1. Field of the Invention

The present invention relates to an illuminating lamp for a display device which is preferably used as a light source of a display device with a backlight, an illuminating device for a display device, and a display device.

2. Description of the Related Art

A liquid crystal display device including a liquid crystal display panel, which is cited as an example of a display device, generally has an illuminating device for a display device arranged behind or at a display surface side of the liquid crystal display panel. The illuminating device includes an illuminating lamp for a display device such as a cold cathode tube that is a light source, and controls the properties of light emitted from the illuminating lamp and projects the light toward a rear side of the display panel. The projected light passes through or is reflected by the display panel, making an image displayed visible on a front side of the display panel.

FIG. 11 is an exploded perspective view illustrating relevant parts of a structure of a conventional liquid crystal display device. A liquid crystal display device 22 includes a bezel 2, a display panel 3 and an illuminating device 4. The bezel 2 is a member that defines a frame of the display panel 3, and the display panel 3 is made by bonding two panels of glass to seal in a liquid crystal therebetween.

The illuminating device 4 includes a frame 5, optical sheets 6, discharge lamps 23, a reflector 10, a backlight chassis 11, side holders 12 and an inverter circuit board 13. The frame 5 is shaped like a picture frame and secures the optical sheets 6 to support surfaces of the backlight chassis 11 and the side holders 12. The optical sheets 6 are for controlling the properties of light which is emitted from the discharge lamps 23 and enters the display panel 3, and are made of, for example, a diffusion sheet, a lens sheet, a polarizing reflection sheet and a diffusion plate.

Both ends of the discharge lamps 23 are inserted into electrode part holders 15 and 16 so as to be secured to the backlight chassis 11. The reflector 10 which is laid under the discharge lamps 23 is for reflecting the light emitted from the discharge lamps 23 toward the display panel 3. The backlight chassis 11 and the side holders 12 are members that define a discharge lamp housing which houses the discharge lamps 23 in parallel. The backlight chassis 11 is made from a metal plate material, which is subjected to plate metal processing so as to be shaped like a box, and constitutes a bottom portion and side-wall portions at the longer edges of the discharge lamp housing. The side holders 12 are members made from a white resin material and constitute side-wall portions at the shorter edges of the discharge lamp housing.

On the rear surface of the backlight chassis 11, the inverter circuit board 13 which generates high pulse voltage to drive the discharge lamps 23 and an inverter circuit board cover 13a which is arranged to cover the inverter circuit board 13 are placed. In addition, a control circuit board 14 which controls the display panel 3 and a control circuit board cover 14a which is arranged to cover the control circuit board 14 are placed on the rear surface of the backlight chassis 11. Incidentally, as a prior art literature relating to the present invention, Japanese Utility Model Application Unexamined Publication No. Hei 05-4133 and Japanese Patent Application Unexamined Publication No. Hei 07-20463 are cited.

As shown in FIG. 12, in the illuminating device 4, the discharge lamps 23 that are the light sources are configured to be driven in a one-side high-voltage driving method with the use of the inverter circuit board 13 in which an electrode part holder 15 side is set to be a high-voltage driving side, and an electrode part holder 16 side is set to be a low-voltage driving side. The backlight chassis 11 made from metal usually is at a ground potential. When the thus-configured discharge lamps 23 are driven, the backlight chassis 11 functions as an adjacent conductor and stray capacitances "Cs" are generated between the discharge lamps 23 and the backlight chassis 11. Accordingly, a current passing through the discharge lamps 23 partly leaks to the backlight chassis 11 functioning as the adjacent conductor so as to be a leakage current "is". Generally, the leakage current "is" increases as the lengths of the discharge lamps 23 increase, resulting in current differences between the high-voltage driving side and the low-voltage driving side, and thereby a luminance gradient occurs in the discharge lamps 23 such that the luminance becomes lower from the high-voltage driving side toward the low-voltage driving side.

In recent years, accompanied by increases in the size of a screen for a liquid crystal display device used in a liquid crystal television set, the lengths of discharge lamps that are light sources increase to cause such a problem that a luminance gradient in the discharge lamps appears as a brightness difference between right and left portions on the display screen.

SUMMARY OF THE INVENTION

In order to overcome the problems described above, preferred embodiments of the present invention provide an illuminating lamp for a display device which is capable of minimizing a luminance difference between a high-voltage driving side and a low-voltage driving side, an illuminating device for a display device having the illuminating lamp, and a display device having the illuminating device.

It is known that even if an internal diameter and gas pressure of a discharge lamp are kept constant, luminance of the discharge lamp changes if a current thereof changes. It is also known that even if a current and an internal diameter of a discharge lamp are kept constant, a diameter of a positive column (plasma) passing through the discharge lamp changes if gas pressure of the discharge lamp changes, and thereby luminance of the discharge lamp changes. In consideration of these facts, the present inventor discovered that even if the current of the discharge lamp decreases toward a low-voltage driving side, decreasing the gas pressure accordingly can suppress a decrease in the luminance. Hence, in order to overcome the problems described above, an illuminating lamp for a display device according to preferred embodiments of the present invention includes discharge lamps connected in series, wherein gas pressures of the discharge lamps at a high-voltage driving side are higher than those of the discharge lamps at a low-voltage driving side.

In this case, a potential of the discharge lamps connected in series at the low-voltage driving side may be floated, or may be grounded. In addition, the discharge lamps connected in series may be arranged in a zigzag configuration.

It is preferable that an illuminating device for a display device includes the above-described illuminating lamps arranged behind a display panel. In addition, it is preferable that a display device includes the illuminating device.

Generally, when discharge lamps having the same gas pressures are connected in series so as to be driven, a leakage current leaking to an adjacent conductor such as a backlight chassis is generated, and currents of the discharge lamps at the low-voltage driving side become smaller than those of the discharge lamps at the high-voltage driving side, whereby the discharge lamps at the low-voltage driving side become dark. In contrast, the illuminating lamp according to the preferred embodiments of the present invention includes the discharge lamps connected in series, wherein the gas pressures of the discharge lamps at the high-voltage driving side are higher than those of the discharge lamps at the low-voltage driving side, and thereby the decreases in the currents of the discharge lamps at the low-voltage side due to the leakage current leaking to the adjacent conductor, that is, the decreases in the luminance, are cancelled out by decreasing the gas pressures of the discharge lamps at the low-voltage driving side, that is, increasing the luminance. Accordingly, a luminance difference between the high-voltage driving side and the low-voltage driving side generated at the time of driving the illuminating lamp can be minimized.

In this case, grounding the potential at the low-voltage driving side of the discharge lamps connected in series allows connection for detecting the currents of the discharge lamps at the low-voltage driving side. In addition, if the discharge lamps connected in series are arranged in a zigzag configuration, luminance irregularity and decrease in the luminance caused by connecting portions of the discharge lamps that define non-radiating portions can be minimized.

According to the illuminating device including the discharge lamps as a light source, and the display device including the illuminating device, a problem of a brightness difference between right and left portions on a display screen of the display device is precluded.

These and other features, elements, characteristics and advantages of the present invention will become more apparent from the following detailed description of preferred embodiments thereof with reference to the drawings.

DETAILED DESCRIPTION OF PREFERRED EMBODIMENTS

Figure 1:
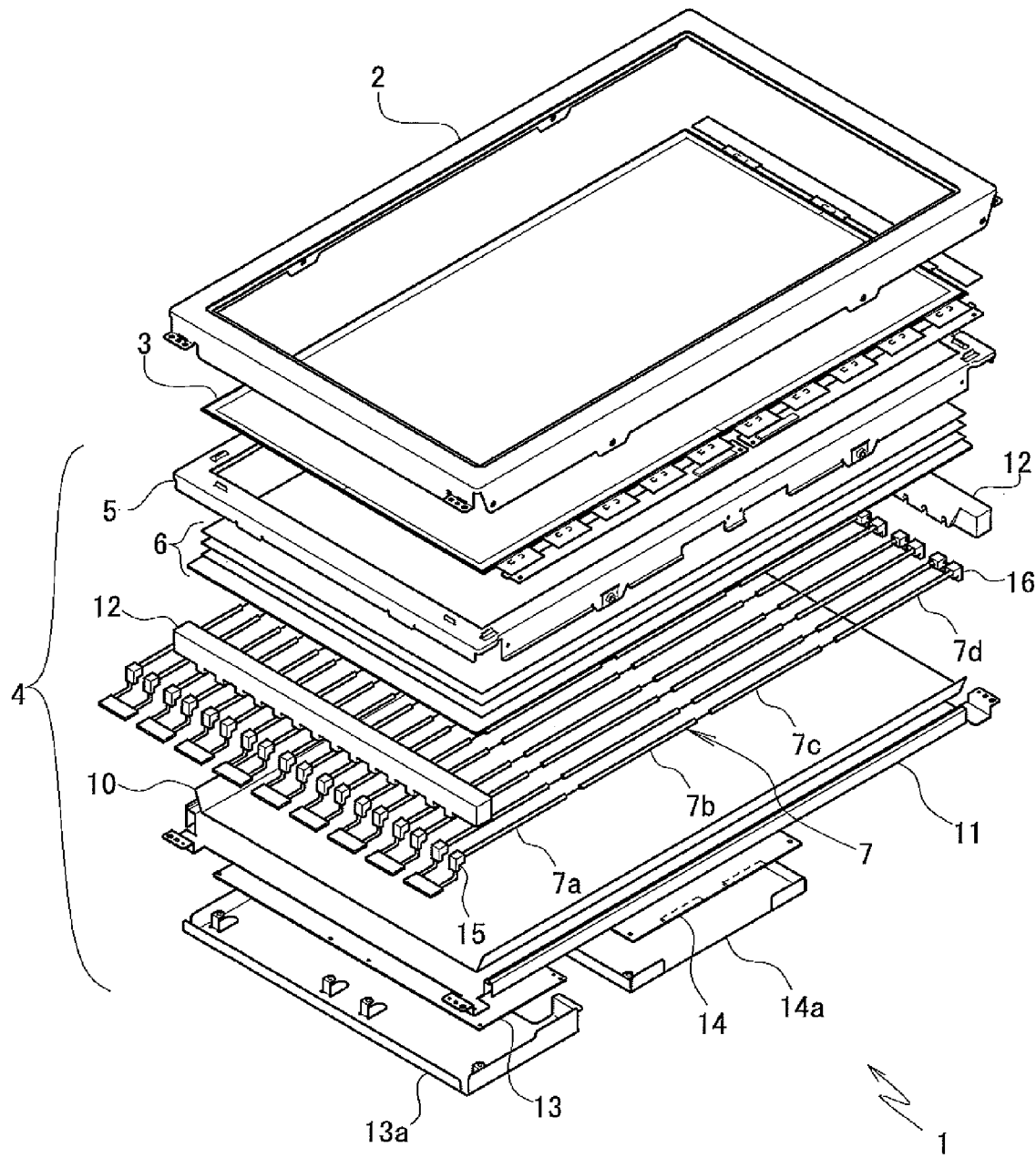
FIG. 1 is an exploded perspective view illustrating a liquid crystal display device according to a preferred embodiment of the present invention.
Figure 2:
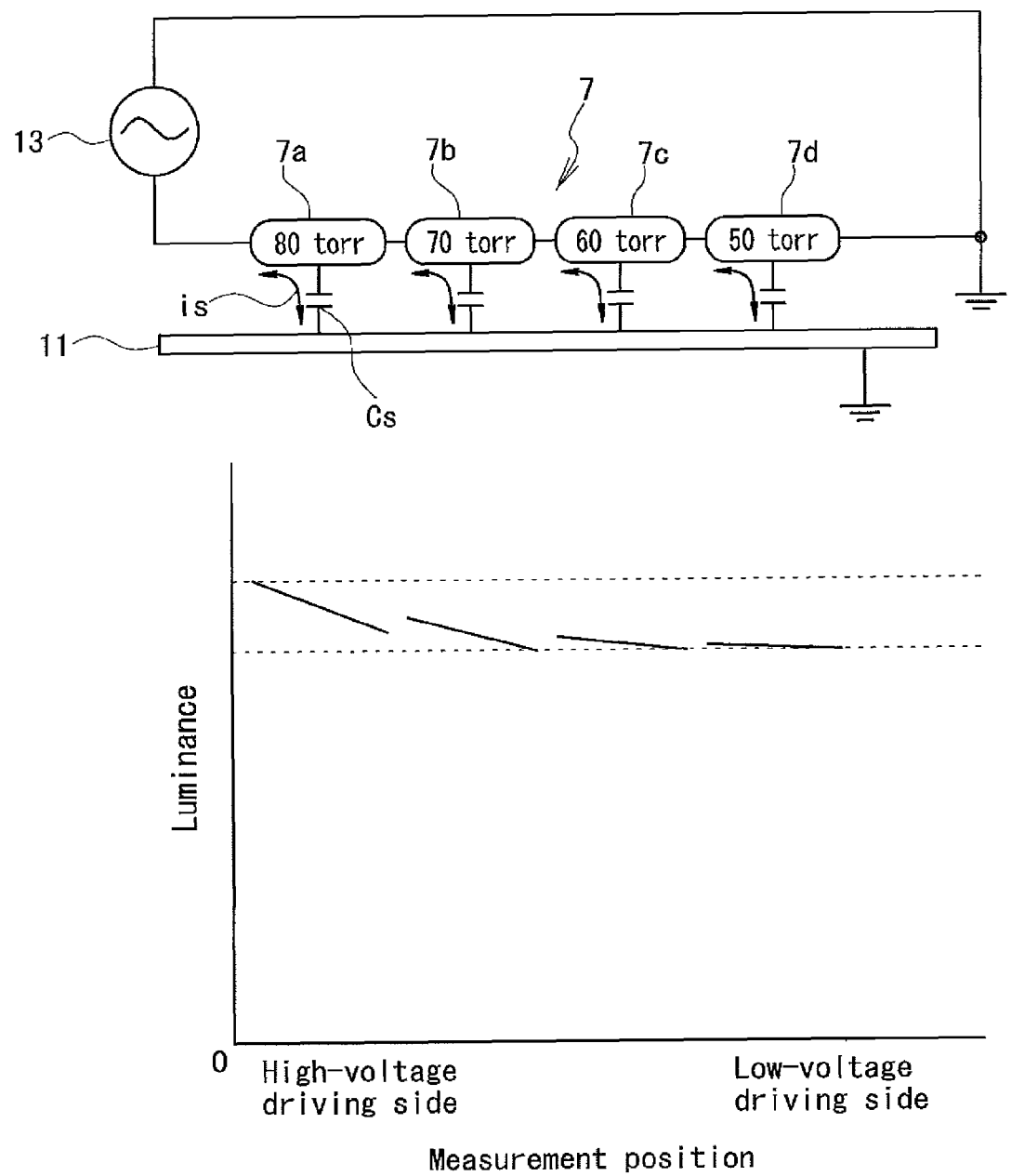
FIG. 2 is a schematic view illustrating an illuminating lamp for a display device according to a preferred embodiment of the present invention included in the liquid crystal display device shown in FIG. 1.

A detailed description of an illuminating lamp for a display device according to preferred embodiments of the present invention will now be provided with reference to the accompanying drawings. FIG. 1 is an exploded perspective view illustrating relevant parts of a structure of a liquid crystal display device 1 including an illuminating lamp for a display device according to a preferred embodiment of the present invention. FIG. 2 is a view showing the luminance distribution in the longitudinal direction of an illuminating lamp shown in FIG. 1 when the illuminating lamp is driven in a one-side high-voltage driving method.

Figure 3A:
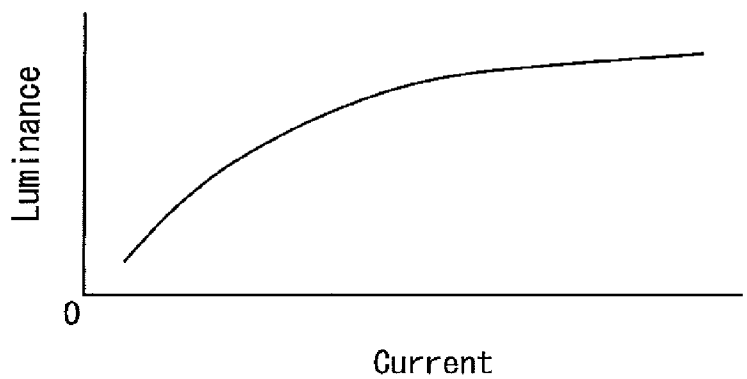
FIGS. 3A, 3B, 3C and 3D are views presented for explaining a basis for the inspiration for various preferred embodiments of the present invention.
Figure 3B:
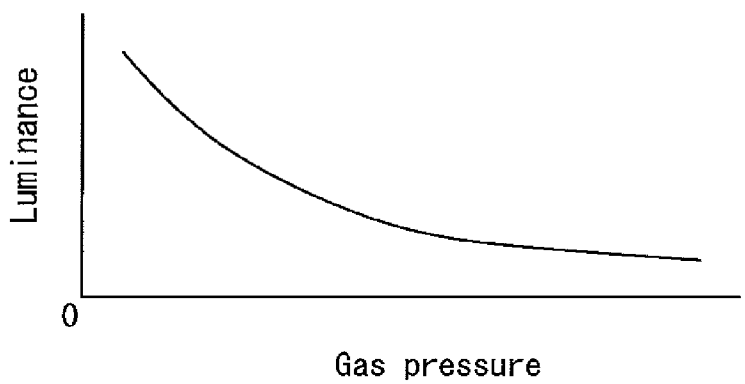
Figure 3C:
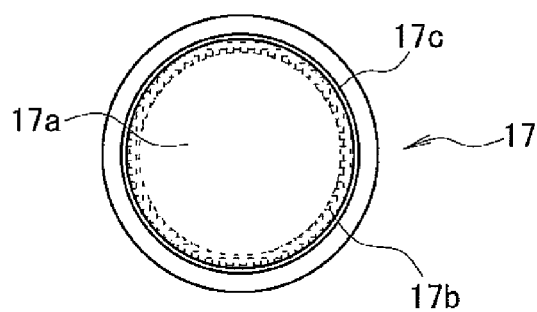
Figure 3D:
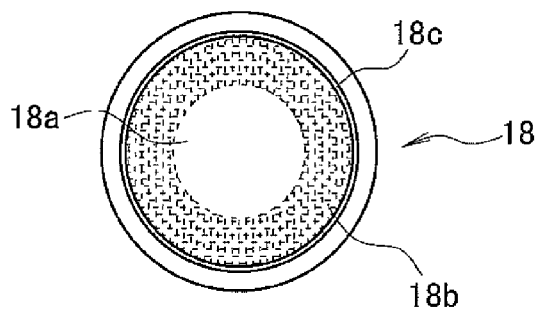
Figure 11:
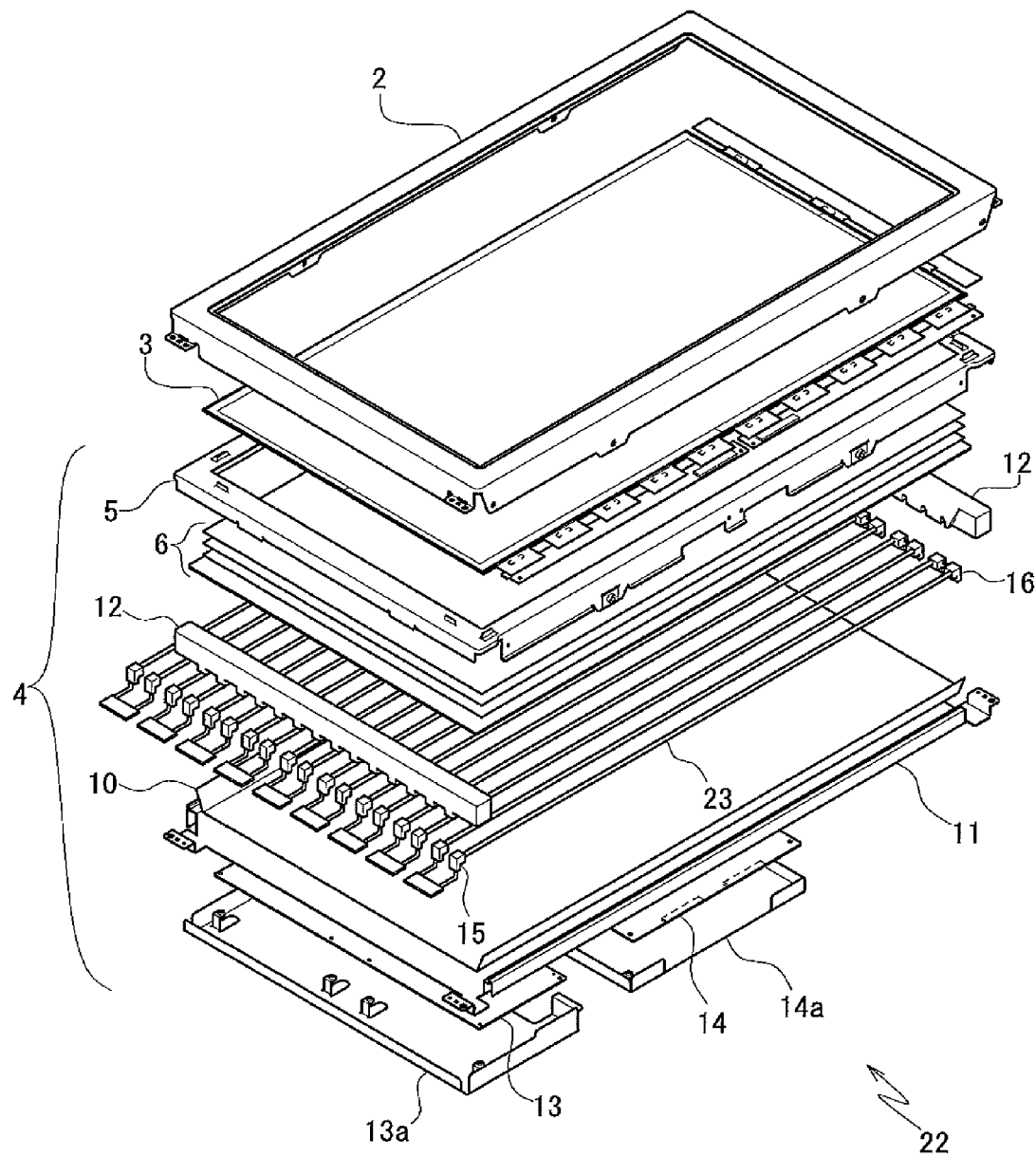
FIG. 11 is an exploded perspective view illustrating a conventional liquid crystal display device.
Figure 12:
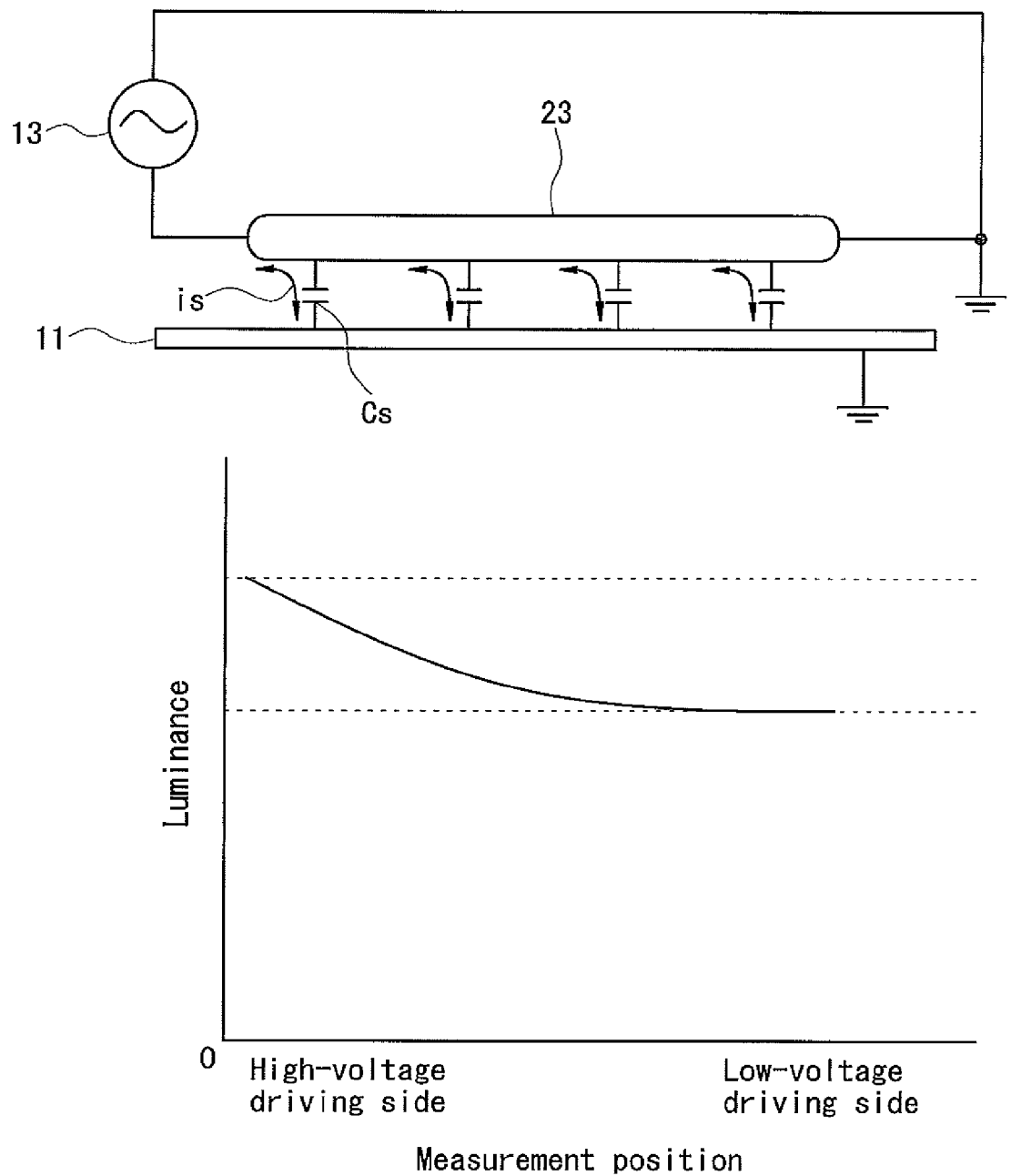
FIG. 12 is a view showing the luminance distribution in the longitudinal direction of a discharge lamp shown in FIG. 11 when the discharge lamp is driven in a one-side high-voltage driving method.

FIGS. 3C and 3D are sectional views of two discharge lamps different in gas pressure and having the same internal diameters and currents when they are driven. Incidentally, explanations of the same elements as those in the liquid crystal display device shown in FIG. 11 which are explained in the Description of the Related Art are omitted while providing the same reference numerals, and different respects are explained mainly.

It is generally known that even if an internal diameter and gas pressure of a discharge lamp are kept constant, luminance of the discharge lamp changes if a current thereof changes as shown in FIG. 3A. This is because there is a correlation between the amount of the current and excitation of a light-emitting material inside the lamp, and the luminance of the discharge lamp increases as the current thereof increases. It is also generally known that even if a current and an internal diameter of a discharge lamp are kept constant, luminance thereof changes if gas pressure thereof changes. This is because the change in the gas pressure causes a change in a diameter of a positive column (plasma) passing through the discharge lamp.

FIG. 3C shows a discharge lamp 17 and FIG. 3D shows a discharge lamp 18, where the discharge lamps 17 and 18 are different in their gas pressure. When the gas pressure of the discharge lamp 18 is higher than that of the discharge lamp 17 and the discharge lamps 17 and 18 have the same currents, the diameter of a positive column (plasma) 18a of the discharge lamp 18 is smaller than that of a positive column (plasma) 17a of the discharge lamp 17 when the discharge lamps 17 and 18 are driven. Accordingly, an inert gas portion 18b of the discharge lamp 18 which is not in a plasma state is thicker than an inert gas portion 17b of the discharge lamp 17. The amount of ultraviolet light emitted in the plasma 18a and absorbed by the inert gas portion 18b is larger than the amount of ultraviolet light emitted in the plasma 17a and absorbed by the inert gas portion 17b so as to make a difference between the amounts of light reaching fluorescent materials 17c and 18c. This shows that the plasma and the fluorescent material coated on the inside of the discharge lamp glow brighter as the plasma and the fluorescent material come closer to each other.

In consideration of these facts, the present inventor discovered that even if the current of the discharge lamp decreases toward the low-voltage driving side, decreasing the gas pressure accordingly can suppress a decrease in the luminance. Consequently, by connecting discharge lamps having different gas pressures in series so that gas pressures of the discharge lamps at the low-voltage driving side are arranged to be lower than those of the discharge lamps at the high-voltage driving side, and thereby a luminance change due to a luminance gradient between the high-voltage driving side and the low-voltage driving side can be suppressed. An illuminating lamp 7 for a display device according to the present preferred embodiment of the present invention shown in FIG. 1 includes discharge lamps connected in series, wherein gas pressures of the discharge lamps at the high-voltage driving side are set to be higher than those of the discharge lamps at the low-voltage driving side as shown in FIG. 2.

In FIG. 2, four discharge lamps 7a, 7b, 7c and 7d are connected in series, and gas pressures of the discharge lamps are preferably set to be, for example, approximately 80 torr, 70 torr, 60 torr and 50 torr, respectively, from the high-voltage driving side. In the case of a small decrease in luminance at the low-voltage driving side, the gas pressures of the discharge lamps may be preferably set to be, for example, approximately 80 torr, 70 torr, 60 torr and 60 torr, respectively, and it is not necessary for the adjacent discharge lamps to always have different gas pressures. It is preferable that the gas pressures of the discharge lamps at portions having a large decrease in luminance are set to be low.

Figure 4A:
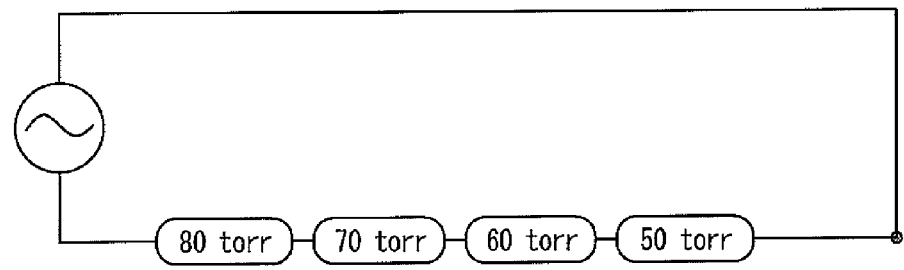
FIGS. 4A, 4B and 4C are views illustrating modified preferred embodiments of a circuit configuration when the illuminating lamp is driven in a one-side high-voltage driving method.
Figure 4B:
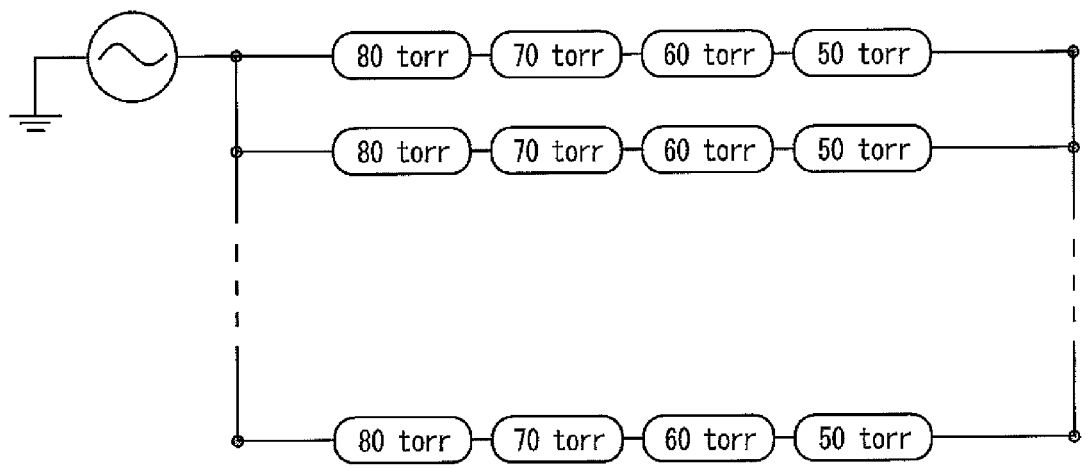
Figure 4C:
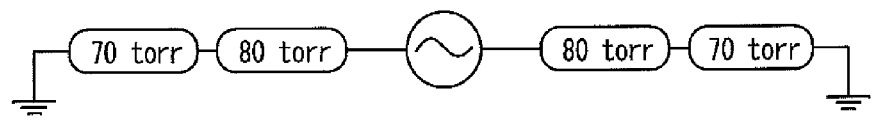

By connecting the discharge lamps in series so that the discharge lamps are arranged in decreasing order of their gas pressures toward the low-voltage driving side, decreases in currents of the discharge lamps at the low-voltage driving side due to a leakage current "is" leaking to an adjacent conductor 11, that is, decreases in the luminance, are cancelled out by decreasing the gas pressures of the discharge lamps at the low-voltage driving side, that is, increasing the luminance as illustrated. Accordingly, a luminance difference between the high-voltage driving side and the low-voltage driving side generated at the time of driving the illuminating lamp 7 can be minimized. FIGS. 4A, 4B and 4C show modified preferred embodiments of an inverter circuit connection when the illuminating lamp 7 is driven in the one-side high-voltage driving method. FIGS. 4A and 4B show a simple circuit configuration such that a potential of the discharge lamps is floated, not grounded, at the low-voltage driving side.

Figure 5:
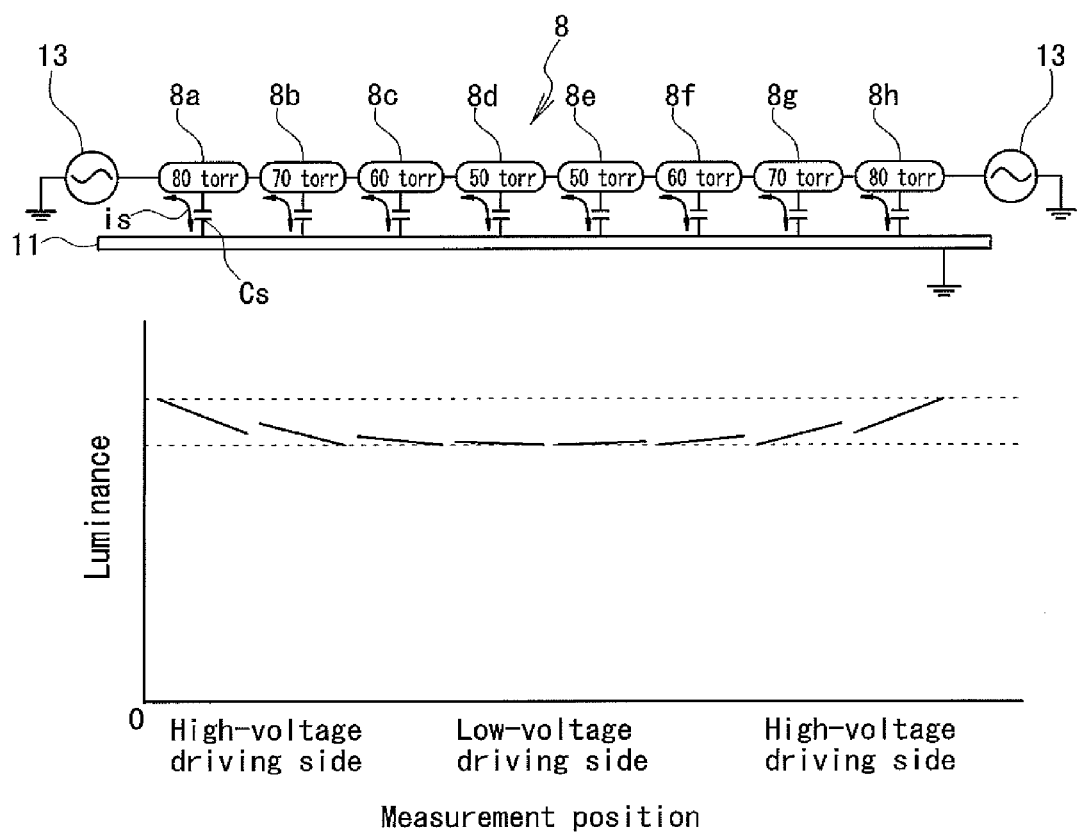
FIG. 5 is a view showing a configuration of the illuminating lamp when the illuminating lamp is driven in a both-side high-voltage driving method.
Figure 6A:
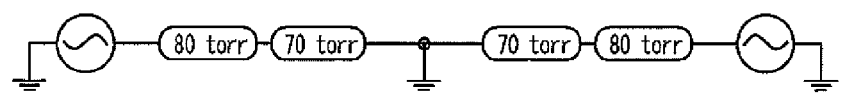
FIGS. 6A and 6B are views illustrating modified preferred embodiments of the circuit configuration when the illuminating lamp is driven in the both-side high-voltage driving method.
Figure 6B:
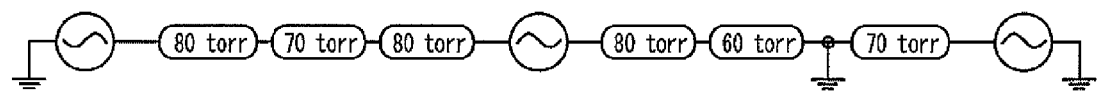

FIG. 5 is a view showing a schematic configuration of an illuminating lamp 8 for a display device when the illuminating lamp 8 is driven in a both-side high-voltage driving method. In the both-side high-voltage driving method, a low-voltage driving side is located at a center portion. Accordingly, eight discharge lamps 8a, 8b, 8c, 8d, 8e, 8f, 8g and 8h are connected in series so that the discharge lamps are arranged in decreasing order of their gas pressures toward the low-voltage driving side at the center portion. In this case, the gas pressures of the discharge lamps are preferably set to be, for example, approximately 80 torr, 70 torr, 60 torr, 50 torr, 50 torr, 60 torr, 70 torr and 80 torr, respectively from the left as illustrated. Accordingly, a decrease in the luminance at the center portion of the illuminating lamp 8 can be minimized. FIGS. 6A and 6B are views showing modified preferred embodiments of the inverter circuit connection when the illuminating lamp 8 is driven in the both-side high-voltage driving method.

Figure 7:
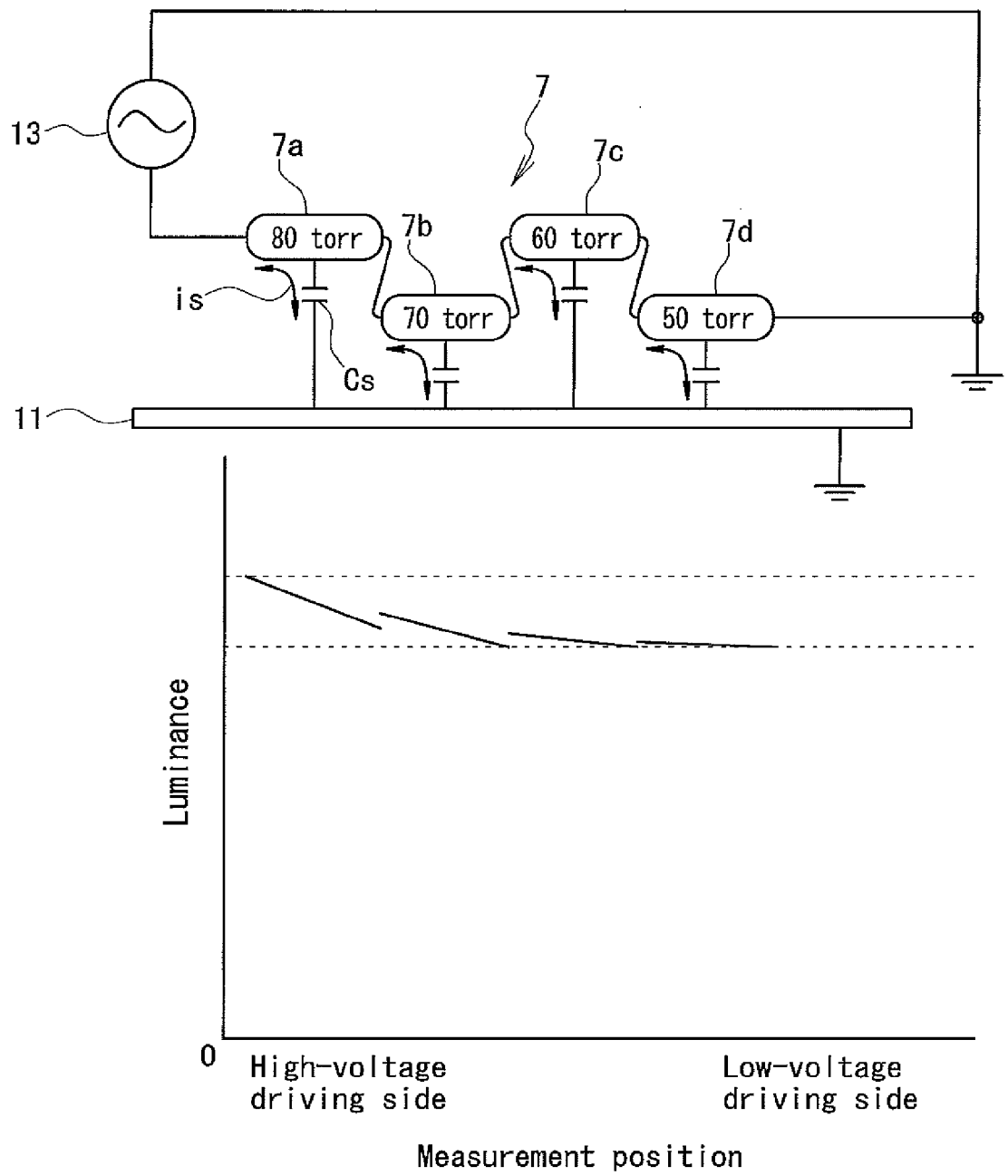
FIG. 7 is a view illustrating a modified preferred embodiment of arrangement of discharge lamps which constitute the illuminating lamp.
Figure 8:
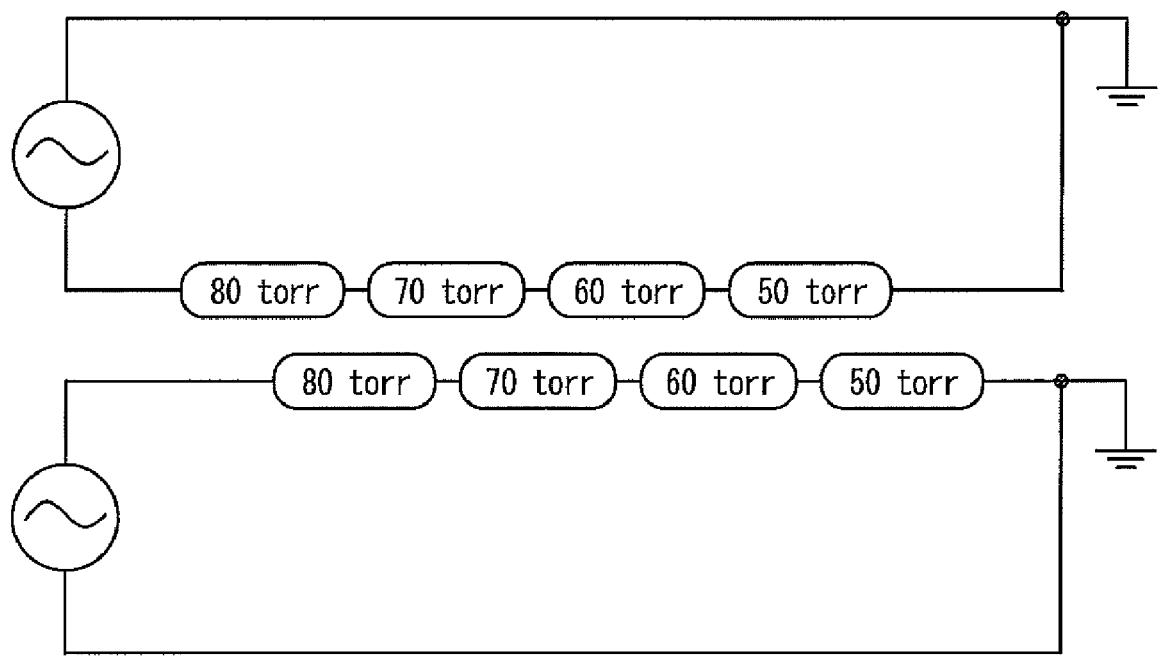
FIG. 8 is a view illustrating a modified preferred embodiment of arrangement of the discharge lamps which constitute the illustrating lamp.

FIG. 7 is a view showing a modified preferred embodiment of the arrangement of the discharge lamps 7a, 7b, 7c and 7d which constitute the illuminating lamp 7 shown in FIG. 2. The discharge lamps 7a, 7b, 7c and 7d connected in series are arranged in zigzag, so that luminance irregularity and the decrease in the luminance caused by connecting portions of the discharge lamps that define non-radiating portions are suppressed. Alternatively, the adjacent illuminating lamps may be displaced so that the discharge lamps are arranged in a zigzag configuration as shown in FIG. 8.

Figure 9:
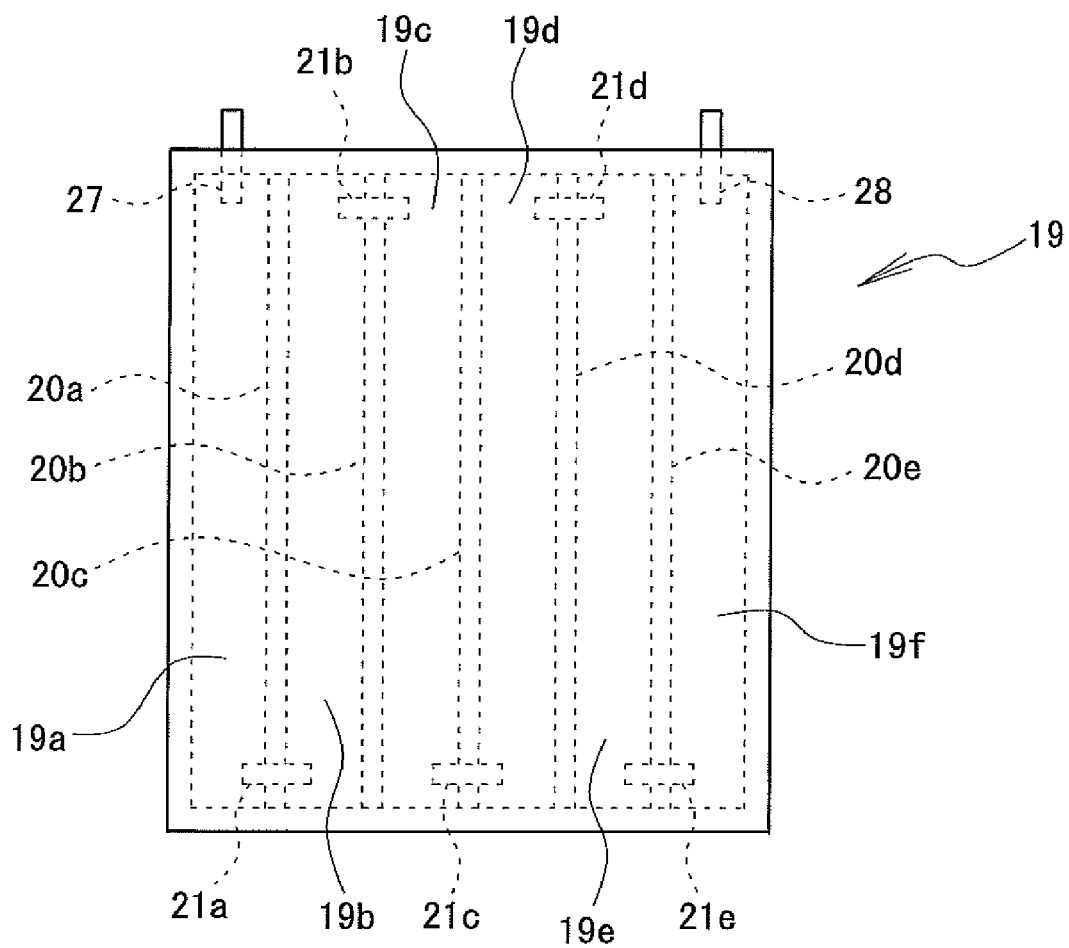
FIG. 9 is a view showing an example in which the illuminating lamp is applied to a flat discharge lamp.
Figure 13:
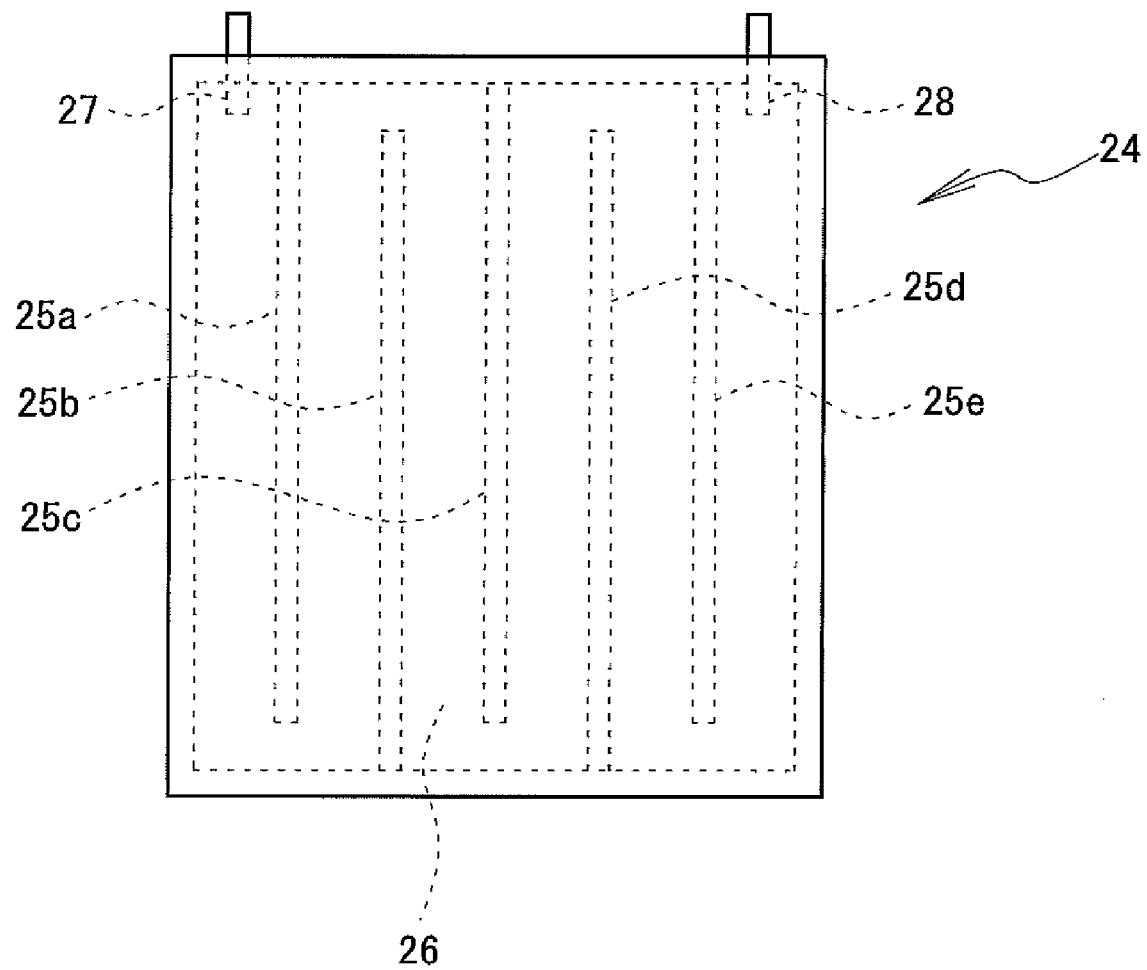
FIG. 13 is a view schematically illustrating a conventional flat discharge lamp.

Next, a description of an illuminating lamp 19 for a display device will be provided referring to FIG. 9 where the illuminating lamp 19 defines a flat discharge lamp. FIG. 13 shows a flat discharge lamp 24 which is conventionally used, and the illuminating lamp 19 according to the present preferred embodiment of the present invention is applied to the flat discharge lamp 24. The flat discharge lamp 24 includes a discharge path 26 in a serpentine form which is defined by dividing plates 25a, 25b, 25c, 25d and 25e arranged in a zigzag configuration inside the discharge lamp 24, and the flat discharge lamp 24 is lit up through electrodes 27 and 28 in the both-side high-voltage driving method. The flat discharge lamp 24 also has a problem such that luminance decreases due to a leakage current leaking to an adjacent conductor, and a center portion of the flat discharge lamp 24 becomes dark because a low-voltage driving side is located at the center portion.

In contrast, the illuminating lamp 19 according to the present preferred embodiment of the present invention shown in FIG. 9 has a structure such that dividing plates 20a, 20b, 20c, 20d and 20e are extended so as to close opening portions, electrodes 21a, 21b, 21c, 21d and 21e are provided to the respective dividing plates, and six discharge lamps 19a, 19b, 19c, 19d, 19e and 19f are arranged in a serpentine form so as to be connected in series. Gas pressures of the discharge lamps 19a, 19b, 19c, 19d, 19e and 19f preferably are, for example, set to be 80 torr, 70 torr, 60 torr, 60 torr, 70 torr and 80 torr, respectively from the left in FIG. 9, whereby the above-mentioned effects can be obtained so as to minimize the decrease in the luminance at the center portion.

The above-described illuminating lamp according to the preferred embodiments of the present invention includes the discharge lamps connected in series, wherein the gas pressures of the discharge lamps at the high-voltage driving side are higher than those of the discharge lamps at the low-voltage driving side, thereby minimizing the decrease in the luminance toward the low-voltage driving side. In addition, the discharge lamps connected in series can be arranged linearly as shown in FIG. 1 or arranged in a serpentine form as shown in FIG. 9.

Figure 10:
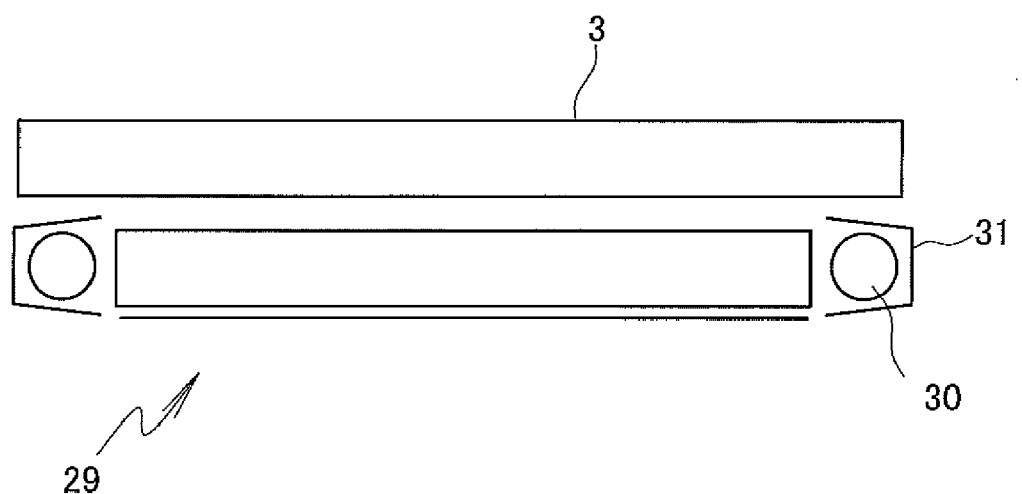
FIG. 10 is a view showing an example in which the illuminating lamp is used as a light source of an edge-lighting illuminating device for a display device.

The present invention is not limited to the preferred embodiments described herein, and modifications and variations are possible as long as they do not deviate from the principles of the present invention. For example, the illuminating lamp according to the preferred embodiments of the present invention may be used as a light source of an edge-lighting illuminating device 29 for a display device shown in FIG. 10. Since such an illuminating device for a display device has a structure such that a lamp reflector 31 which behaves as a cover of a light source 30 functions as an adjacent conductor to a large degree, the actions and effects brought about by the illuminating lamp according to the preferred embodiments of the present invention are remarkable.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An illuminating device for a display device, which is disposed behind a display panel, the illuminating device comprising:
   a backlight chassis made from a metal plate material; and
   a plurality of discharge lamps connected in series and disposed on the backlight chassis;
   wherein
   gas pressures of the discharge lamps at a high-voltage driving side are higher than gas pressures of the discharge lamps at a low-voltage driving side.

2. The illuminating device for a display device according to claim 1, wherein a potential of the discharge lamps connected in series is floated at the low-voltage driving side.

3. The illuminating device for a display device according to claim 1, wherein a potential of the discharge lamps connected in series is grounded at the low-voltage driving side.

4. The illuminating device for a display device according to claim 1, wherein the discharge lamps connected in series are arranged in a zigzag configuration.

5. A display device comprising the illuminating device for a display device according to claim 1.

* * * * *